(12) United States Patent (10) Patent No.: US 8,589,431 B2
Ramaswamy et al. (45) Date of Patent: Nov. 19, 2013

(54) SYSTEM AND METHOD FOR ENABLING SMART CONTACTING AND RESOURCE FINDING IN AN ENTERPRISE

(75) Inventors: Satyanarayanan Ramaswamy, Cupertino, CA (US); Jose Paul Puthenkulam, Beaverton, OR (US); Nixon Pallickal Xavier, Portland, OR (US); Pankaj Mhatre, Santa Clara, CA (US); Manoj Sreedharan, Arlington Heights, IL (US)

(73) Assignee: Tata Consultancy Services Limited, Maharashtra (IN)

( * ) Notice: Subject to any disclaimer, the term of this patent is extended or adjusted under 35 U.S.C. 154(b) by 0 days.

(21) Appl. No.: 13/421,563

(22) Filed: Mar. 15, 2012

(65) Prior Publication Data

US 2013/0086108 A1 Apr. 4, 2013

Related U.S. Application Data

(60) Provisional application No. 61/540,759, filed on Sep. 29, 2011.

(51) Int. Cl.
*G06F 7/00* (2006.01)
*G06F 17/00* (2006.01)
*G06F 17/30* (2006.01)
*G06F 15/16* (2006.01)

(52) U.S. Cl.
USPC ............................ 707/769; 707/604; 709/232

(58) Field of Classification Search
USPC ............ 707/755; 455/414.1, 456.3; 715/753, 715/763; 709/206; 726/4
See application file for complete search history.

(56) References Cited

U.S. PATENT DOCUMENTS

| 2005/0227676 | A1* | 10/2005 | De Vries ..................... 455/414.1 |
| 2010/0179964 | A1 | 7/2010 | Ramaswamy |
| 2011/0041084 | A1* | 2/2011 | Karam .......................... 715/753 |
| 2011/0131221 | A1* | 6/2011 | Bhide et al. ................... 707/755 |
| 2011/0167125 | A1* | 7/2011 | Achlioptas ..................... 709/206 |
| 2012/0030592 | A1* | 2/2012 | Cui et al. ....................... 715/763 |
| 2012/0220314 | A1* | 8/2012 | Altman et al. ............. 455/456.3 |
| 2012/0291103 | A1* | 11/2012 | Cohen ............................. 726/4 |

OTHER PUBLICATIONS

Wikipedia Quick Response Code searching on date: Mar. 2, 2013.*
QRHistory searching on date: Mar. 2, 2013.*

* cited by examiner

*Primary Examiner* — Susan Chen
(74) *Attorney, Agent, or Firm* — Oliff & Berridge, PLC (57) ABSTRACT

The present application provides a PeopleFinder system, a related method and a PeopleFinder device for enabling smart and more efficient contacting for enterprise professionals. The present application enables building a multi-stage search query with one or more combinations of possible search fields in a contact record or resource information records such as conference rooms, special purpose rooms, copiers or printers, and the like. Upon retrieving the search results from a server that is connected to an enterprise directory server the search results are presented on a mobile device along with adaptation of the results using location information. The invention enables the search results to display enterprise contact or resource records based on employees or resources that may be near the user performing the search.

17 Claims, 11 Drawing Sheets

| | People | + |
|---|---|---|
| | 🔍 adam seattle ⊗  ◁ Search | |

| | | |
|---|---|---|
| ALL | Adam David | |
| A | | |
| B | Seattle | |
| C | Adam Agustin | |
| D | | |
| E | Gibsonia | |
| F | Adam Bair | |
| G | | |
| H | Dearborn | |
| I | Adam Baker | |
| J | | |
| K | Gladwin | |
| I | Adam Banister | |
| J | | |
| K | Pompano Beach | |
| L | Adam Baugher | |
| M | | |
| N | Reno | |
| O | Adam Beasley | |
| P | | |
| Q | Morrisville | |
| | Adam Berg | |
| L | | |
| M | Detroit | |

| 🔍 People | ☆ Fast | Check | ▦ Scan |
|---|---|---|---|

SYSTEM AND METHOD FOR ENABLING SMART CONTACTING AND RESOURCE FINDING IN AN ENTERPRISE

CROSS-REFERENCE

The present application claims Priority from Provisional Application Ser. No. 61/540,759, filed Sep. 29, 2011, the disclosures of which are hereby incorporated herein by reference.

FIELD OF THE INVENTION

This invention generally relates to a system, method and a related device for smarter contacting or resource finding in an enterprise.

BACKGROUND OF THE INVENTION

Growth of mobile telephony and plurality of wireless networks provide various facilities to the users today. One of these facilities is person or resource searching. Disparate topographies present a plurality of issues relating to searching of various resources located throughout the landscape. Further, providing such a facility on a mobile device adds on to the problems since a mobile device such as a mobile phone lacks a substantial keyboard to enter information, a mouse, and a big monitor to see, navigate and understand the results of a search. In view of such problems, there exists a need for a mechanism that may be devised by utilizing limited resources available in a mobile device that may provide the convenience to the users to perform resource searches via the mobile device.

At present, the available solutions involve searching for information using key phrases that require the user to type a key phrase using an available input means such as a keyboard, keypad, and the like. Such searches require extensive input of key phrases that may be difficult while using a mobile device.

The present invention describes a system, method and a device for searching that enables multiple search terms in a multi stage query while looking up enterprise contact information or resource record information presenting the search results on a mobile device along with adaptation of the results using location information.

In order to solve the problems faced at present while resource searching, the current invention proposes a system and device that utilizes an on-line mode of operation and thereby makes use of a two stage multi term search paradigm with limited text input that may retrieve search term suggestions even with single letter inputs from a PeopleFinder application server. The present invention then proposes to combine the search results with location information relevant to the user performing the search. The method described herein also combines the search results with the location specific information to augment the quality of the results presented to the user.

The two stage search being employed in the present invention is based on United States Patent Application US 20100179964 titled "User interface and system for two-stage search."

Other features and advantages of the present invention are explained in the following description of the invention having reference to the appended drawings.

SUMMARY OF THE INVENTION

The following presents a simplified summary of the subject disclosure in order to provide a basic understanding of some aspects thereof. This summary is not an extensive overview of the various embodiments of the subject disclosure. It is intended to neither identify key or critical elements nor delineate any scope. Its sole purpose is to present some concepts of the subject disclosure in a simplified form as a prelude to the more detailed description that is presented later.

The terms PeopleFinder system, PeopleFinder client, PeopleFinder server, and PeopleFinder database server may also be referred throughout the specification as System, Client, Server, and database server respectively.

One or more embodiments of the present application provide a PeopleFinder system, a related method, and a PeopleFinder device for enabling smart and more efficient contacting for enterprise professionals. The present invention enables building a multi-stage search query with one or more combinations of possible search fields in a contact record or resource information records such as conference rooms, special purpose rooms, copiers or printers, and the like. Upon retrieving the search results from a server that is connected to an enterprise directory server the search results are presented on a mobile device along with adaptation of the results using location information. The invention enables the search results to display enterprise contact or resource records based on employees or resources that may be near the user performing the search.

In an embodiment, the system, method, and device described herein enable a user to check-in at a current location where the user may be present. A PeopleFinder device on launch automatically or explicitly through a user action may enable a user to check-in at the current location and may save such location related information for adaptation of other user features within the application.

Upon receiving a person's contact information or information regarding a resource as a search result the invention may facilitate the user to look up the person's contact information or the resource information. Further, the system and device may enable detecting the time zone of the person or the resource depending on their location. Such functionality may require the looked up person or resource to enable location sharing.

Once a looked up person's current time zone is detected, the device described herein may enable the user to check if that person has enabled call barring. In case the person has enabled call barring, the device may provide visual cues suggesting alternate means like SMS or Email for communicating during call barred periods. The system and device may also provide an option to the caller to get an asynchronous notification when the call barring period has lifted for the called party. The asynchronous notification enables the caller to realize that the called party may be available for a call at that time.

In an embodiment, the system may enable the user to record the recent contacts history corresponding to a person from the contact field, along with current location information for each call based on the user check-in facility. The system may also enable retrieving the call history results based on the most recently called contacts in each location the user travels to and checks-in.

According to yet another embodiment, the system may enable retrieving the call history based on the time when a user checks the recent call history. For example, an employee may call a contact person at 5 PM regularly, therefore according to the present embodiment at 5 PM the call history shows the contacts that are generally called at that time with the highest frequency at the top of the list and gradating therein.

The system and device may further enable looking up a search result such as a person's office or resource's location on an office building floor map along with a multiple zoom level facility.

In yet another embodiment, the system, and device may provide a distinctive looking screen in the mobile application that may provide a quick response code or QR code for the mobile device owners contact information.

In an embodiment, the system and device may provide a distinctive looking Organization chart traversal facility that may enable viewing enterprise contacts organization charts in a sequential manner upward or downward in the tree structure. For example, a user may be enabled to check in a plurality of contacts as an organizational chart with respect to a contact that may have been provided as a search result.

In another embodiment, the system and device may enable controlling the location information visible to various employees within the organization tree using a setting option on the server or client application. The setting option may include a plurality of options that could be controlled by an administrator or user. In an aspect, the setting option may enable an administrator or user to determine and control the people who may be able to view the user's location information. For example, all the members of an organization below the user may be enabled to view the user's location information. In another example, all the members of an organization up to a selectable number of finite levels below the user may be enabled to view the user's location information. Further, all the members of an organization up to a selectable number of finite levels who may be above the user in organizational hierarchy may be enabled to view the user's location information. In yet another scenario, the user may allow his peers to view his location information. In yet another example, only a selected list of people in the organization may be enabled to view the user's location information, said list of people either may be controlled by the user or may be controlled by an administrator. Another example may be cited wherein a selected list of people may view a user's location information. The list of people may be constructed by using a permission process wherein a first user may request a second user to allow the first user to view the location information of the second user. The second user may grant permission to the first user for accessing their location information. Such a permission process may also facilitate a user to see which all users are viewing their location information and may enable a user to dynamically change permissions at any time.

To the accomplishment of the foregoing and related ends, the subject disclosure, then, comprises the features hereinafter fully described. The following description and the annexed drawings set forth in detail certain illustrative aspects of the subject disclosure. However, these aspects are indicative of but a few of the various ways in which the principles of the subject disclosure can be employed. Other aspects, advantages, and novel features of the invention will become apparent from the following detailed description of the subject disclosure when considered in conjunction with the drawings.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the present document example constructions of the invention; however, the invention is not limited to the specific methods and apparatus disclosed in the document and the drawing.

DETAILED DESCRIPTION OF THE INVENTION

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The disclosed embodiments are merely exemplary of the invention, which may be embodied in various forms.

Figure 1:
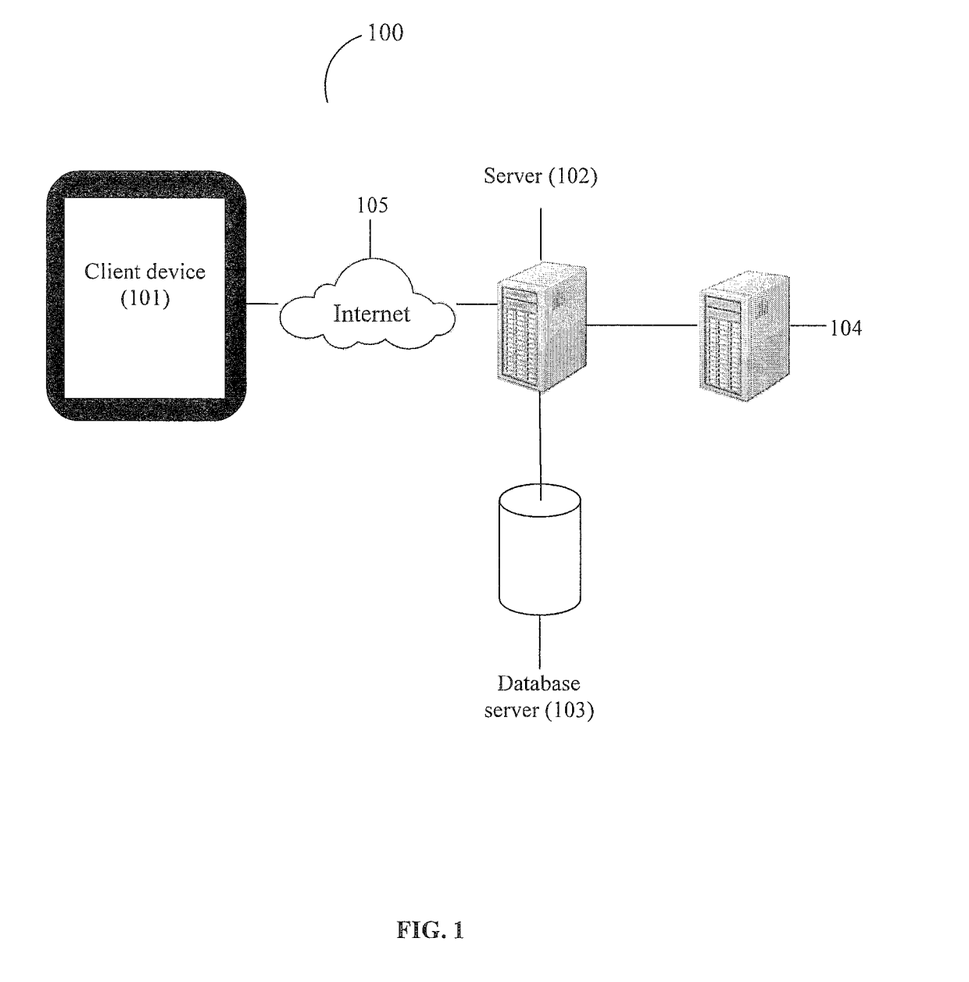
FIG. 1 illustrates an exemplary embodiment of the PeopleFinder enterprise system.

FIG. 1 describes a deployment overview of PeopleFinder enterprise system (100) in accordance with an embodiment. The PeopleFinder enterprise system comprises of a plurality of components including but not limited to a PeopleFinder Client (101), a PeopleFinder Server (102), a PeopleFinder database server (103), one or more enterprise database (104), and Internet (105) that connects the PeopleFinder Client (101) to the PeopleFinder Server (102). The PeopleFinder Client (101) interfaces with the PeopleFinder Server (102) for searching one or more enterprise database (104), and the staging database PeopleFinder database server (103) for storing specific data retrieved from back end systems. In an embodiment, the one or more enterprise database (104) may store records containing person data, building information including office floor maps, contact information, conference room details, and the like.

The PeopleFinder enterprise system (100) may further comprise of a plurality of contact records. Such contact records may be data structures containing contact details of a contact person such as First Name, Last Name, Organization name, Work Phone Number, Mobile Phone Number, Home Phone Number, Fax Number, Work Address, Home Address, Office Cubicle Number, Email Address, Manager Id, Geo Location coordinates, Expertise Profile Information, and the like for each contact person in an enterprise. In an aspect said contact, records may be fully or partially stored in a plurality of enterprise backend servers described above.

The PeopleFinder enterprise system (100) may also include a plurality of resource records. Such contact records may be data structures containing full or partial contact details of a resource such as Resource Name, Organization, Phone Number, Address, Office Cubicle Number, Email Address, and the like for each resource in the enterprise that are fully or partially stored in various enterprise backend servers. In an aspect, the resources may be a Conference room, printer, copier, and the like. In an aspect said resource, records may be fully or partially stored in a plurality of enterprise backend servers described above.

The PeopleFinder Client (101) is a mobile device or mobile application provided on a mobile device that may provide a user with a rich Graphical User Interface. The PeopleFinder Client (101) may be executed on a smart phone platform or a tablet platform factor or closely related custom form factor device that is portable or mobile. The client may also provide a plurality of functionalities including those described in this invention. Such functionalities may be used by users by employing PeopleFinder server functions by communicating with it using web-based protocols such as http protocol performing XML data queries and responses.

The PeopleFinder Client (101) may employ web-based queries such as XML queries to the PeopleFinder server (102) that in turn translates it into search engine processing requests or queries to the PeopleFinder database (103). The search engine utilizes the multi stage search method as described in the U.S. Patent application no. US 20100179964 for achieving fast and optimal search results.

The PeopleFinder server (102) may be a server side application that may act as a web service application along with an optimized search engine that is implementable on any server platform with necessary resources such as adequate CPU processing power, memory, non-volatile data storage, and the like. The PeopleFinder server (102) may interface with one or more of enterprise backend servers such as enterprise database (104). The PeopleFinder server (102) may employ the PeopleFinder database (103) for staging of specific data required by the PeopleFinder application.

The PeopleFinder database (103) may be a database server that may only be accessible through the PeopleFinder server (102) and may be implemented on the same host as the PeopleFinder server (102) using a database software. The PeopleFinder server (102) connects to one or more enterprise backend servers one or more enterprise database (104) for retrieving the enterprise contact records or resource records securely and may store the required information and data on the PeopleFinder database (103) that may act as a staging database.

Figure 2:
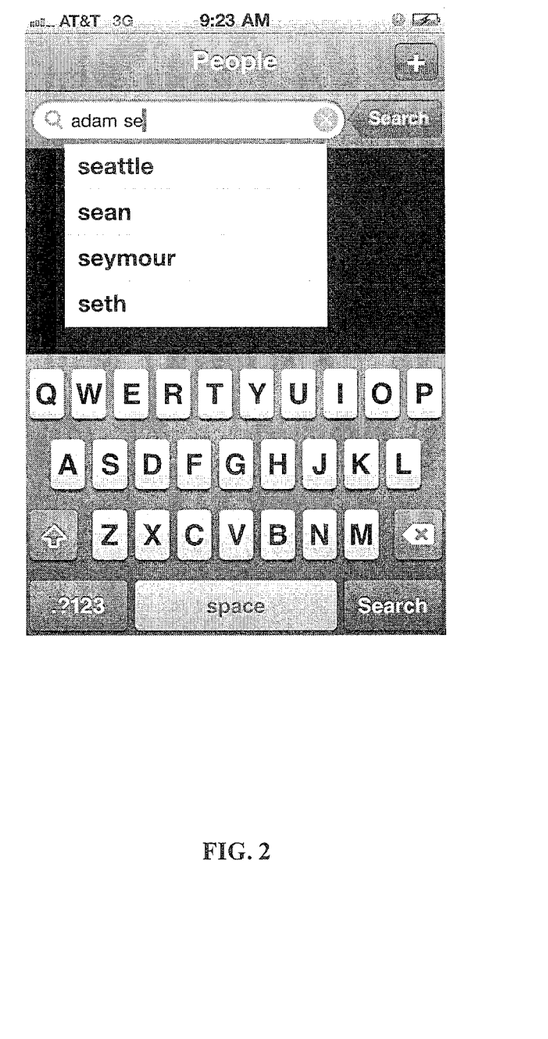
FIG. 2 illustrates a search screen provided on the mobile device described in accordance with an embodiment of the present invention.
Figure 3:
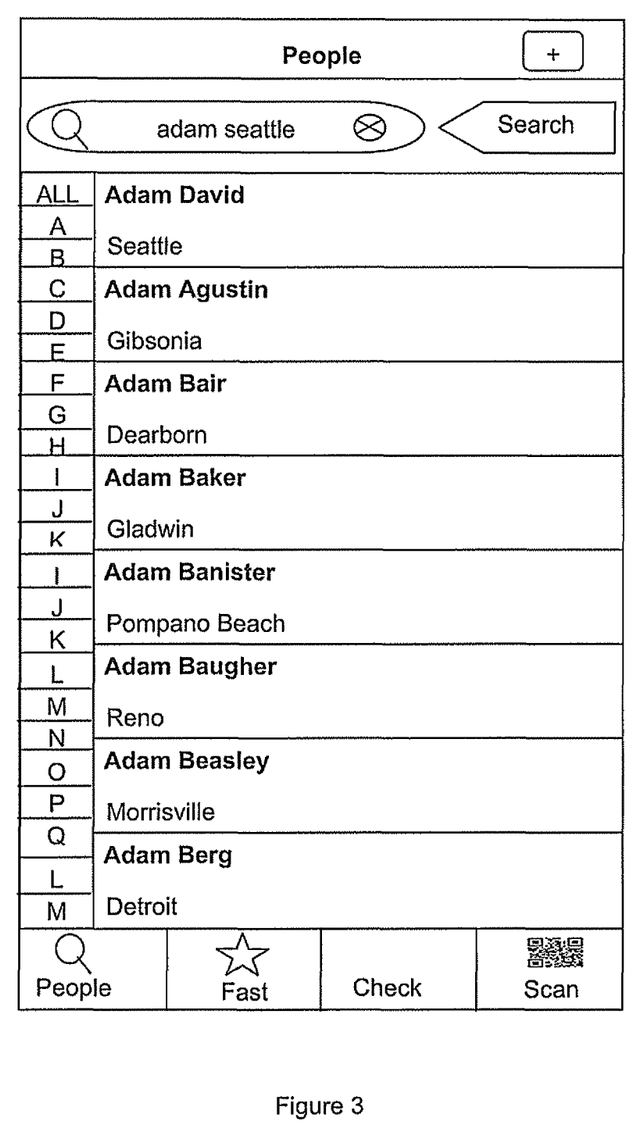
FIG. 3 illustrates a list of search results provided on the mobile device in accordance with an embodiment.

The present invention provides a search method that may be employed on a mobile device such as mobile, tablet, and the like. The search method may employ a multi stage search algorithm as described in U.S. Patent application no. US20100179964 that may be implemented on the PeopleFinder server (102). The PeopleFinder Client (101) may enable a user to enter text input in a search box as shown in the FIG. 2. For example, the PeopleFinder Client (101) may enable the user to conduct a multi term search as shown in the FIG. 2 with suggestions to build up a search query. As the user enters each letter the "search text" is sent to the PeopleFinder server (102) that may utilize the Search Engine as described in US 20100179964 to return relevant search suggestions as shown in FIG. 2. The user may start entering a first search term that is sent to the PeopleFinder server (102), which results in a first set of search suggestions. The user may pick a desired term from the first suggestion list and then may either enter more terms and the process may continue till the query is complete. Upon selecting the various search terms, the user may be enabled to press the search button in the PeopleFinder Client (101). At this stage, the PeopleFinder server (102) employs the search engine to processes all the search terms entered by the user and returns a list of relevant search results as shown in FIG. 3.

The list of relevant search results are generated based on most relevant contact record or resource record that may match the search terms entered by the user employing the multi stage search method further the current location information of the user performing the search is also combined in the search, such that the results for contacts or resources nearby are presented on the top of the list.

Figure 4:
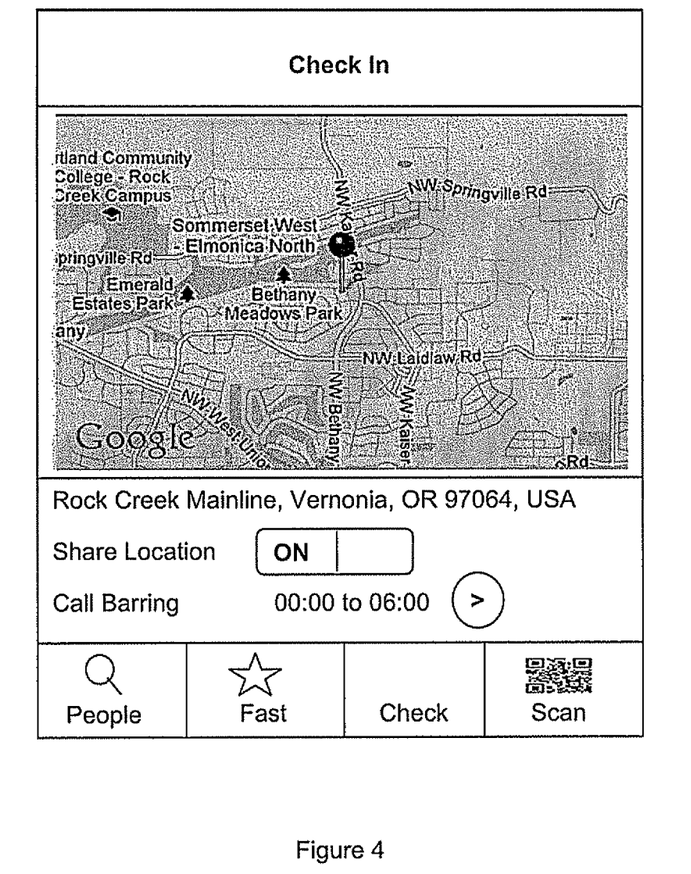
FIG. 4 illustrates the check-in facility provided on the mobile device in accordance with an embodiment.
Figure 5:
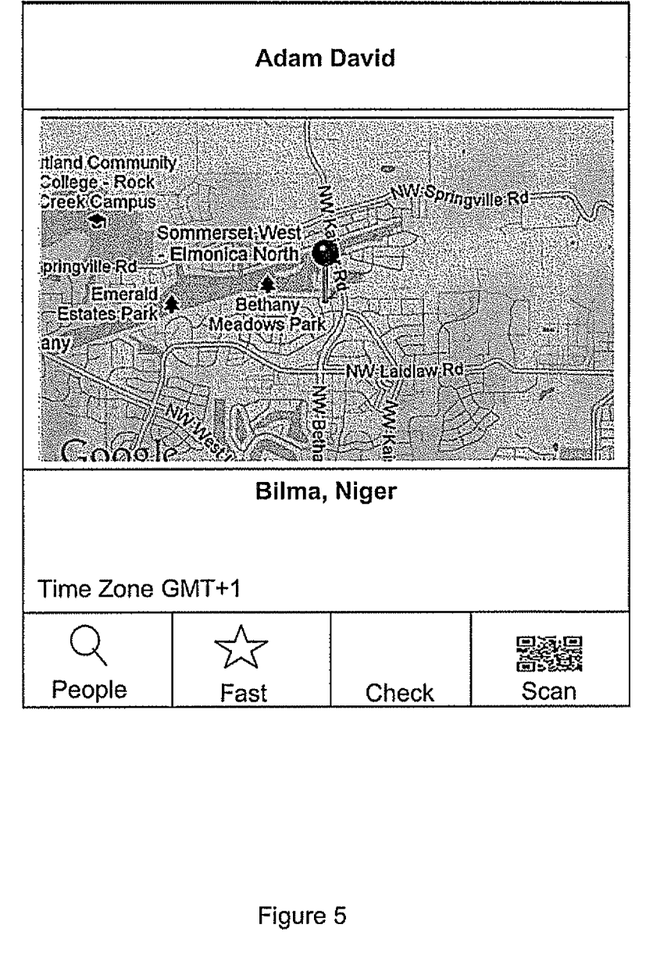
FIG. 5 illustrates a current location screen provided on the mobile device in accordance with an embodiment.

In an embodiment, the PeopleFinder mobile device employing the PeopleFinder Client (101) may provide a PeopleFinder Check-in facility to share location information. The PeopleFinder Client (101) may provide the facility to check-in at the current location of a user or resource through the GUI provided on the PeopleFinder mobile device as shown in FIG. 4. The Check-in facility may involve the PeopleFinder Client (101) to employ the GPS capability of the Mobile device to detect the current GPS co-ordinates of the user and may enable sending the co-ordinates to the PeopleFinder server (102) for storage in the PeopleFinder database (103). Once a user or a controller of a resource has the present location stored in the PeopleFinder database (103) and if the location sharing setting in the mobile device is enabled, their new location may be stored in the PeopleFinder server (102) and same may be indicated in a list of search results for that contact person or resource. As illustrated in FIG. 5 a person or resource's current location may be displayed as and when said person or resource checks in to a new location.

Figure 6:
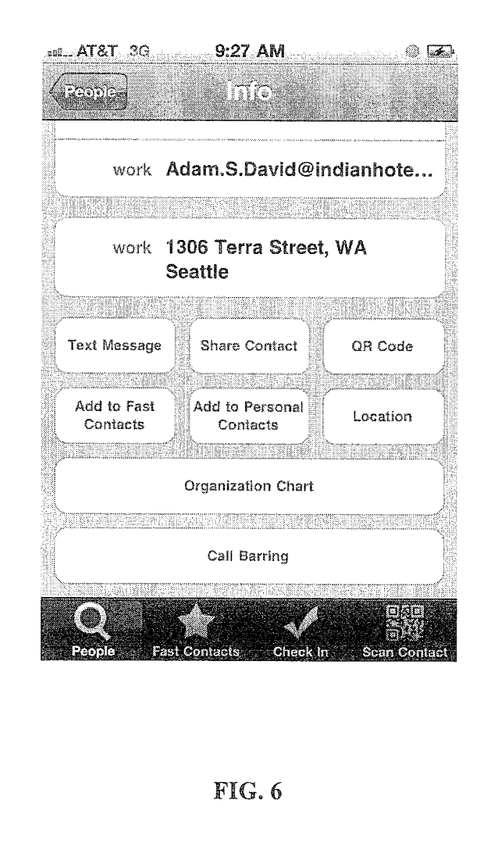
FIG. 6 illustrates a contact screen providing a plurality of details regarding a contact person or resource in accordance with an embodiment.

According to an embodiment, the invention may facilitate determining the time zone of a contact person or a resource. Once a contact or resource is searched, the user may be enabled to select a contact or resource for checking the respective details on the mobile device employing the PeopleFinder Client (101). The details regarding the contact or resource may include the time zone the user may select the corresponding option to view the same. As illustrated in FIG. 6 the user may select the Location button to view the time zone corresponding to a contact or resource. The time zone may appear as in FIG. 5, where the time zone is shown. Once the user selects the time zone option on the PeopleFinder Client (101) the PeopleFinder server (102) is contacted to retrieve the location details regarding a contact/resource from the PeopleFinder database (103). The PeopleFinder database (103) stores the Location information updated for every Contact Record or Resource Record once a check-in operation is done. PeopleFinder server (102) also retrieves the time zone as it may be computed from the Geo location co-ordinates based on a look up table in the PeopleFinder database (103). In an aspect, the time zone detection facility may only be provided if the location sharing setting in the PeopleFinder Client (101) corresponding to a particular contact or resource is enabled.

Figure 7:
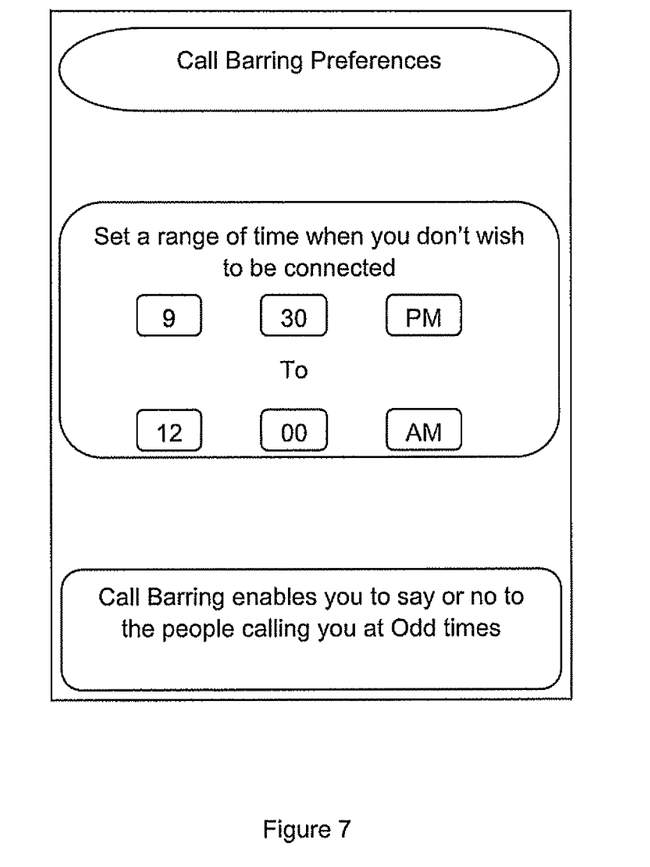
FIG. 7 illustrates a call barring setting screen provided on a mobile device in accordance with an embodiment.

In an embodiment, the system may provide a contact call barring facility as illustrated in FIG. 7. Each user may select the call barring setting in his respective mobile device employing the PeopleFinder Client (101) to set the times they would like to avoid being called. Such setting information may then be stored by the PeopleFinder Client (101) on the PeopleFinder database (103) through the PeopleFinder server (102) web service call. In addition when a call is initiated to a party that has call barring enabled, the PeopleFinder Client (101) may provide the user with an option implemented to receive an asynchronous notification when the called party's call barring period is over. The PeopleFinder Client (101) in this case saves the option setting on the mobile device and then also registers a call back event with the PeopleFinder server (102) using a web service call. A call back timer on the server gets triggered on the expiry of the call barring period and it sends an asynchronous message to the PeopleFinder Client (101) using push notifications.

Figure 8:
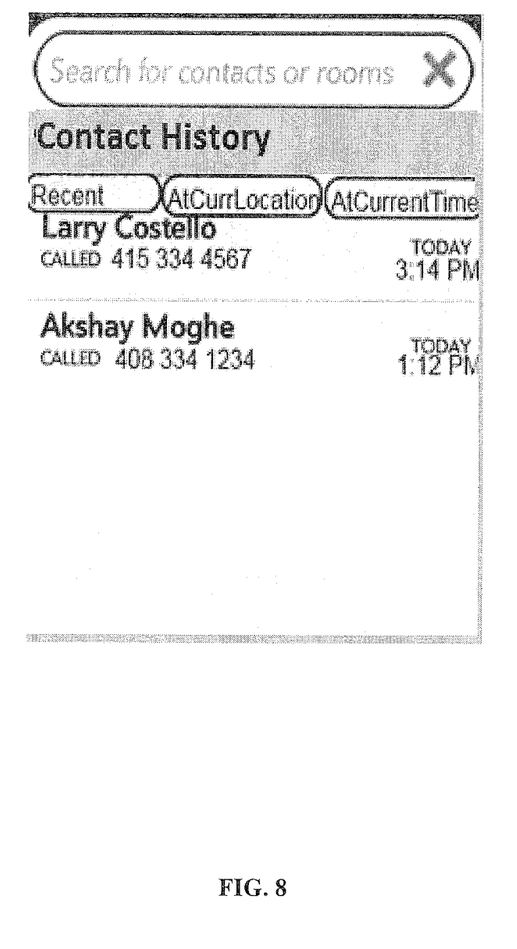
FIG. 8 illustrates a contact call history screen provided on a mobile device with location and time filters in accordance with an embodiment.

In an embodiment, the system and mobile device may provide the call history of a user based on the call history of the user, same has been illustrated in FIG. 8. When a user makes a call the PeopleFinder client (101) may capture the GPS co-ordinates of the location from where the user is calling. These GPS co-ordinates are then stored in the PeopleFinder database (103) via the PeopleFinder server (102). Therefore, the call history that may be a configurable list of one or more entries is maintained with all the locations from which any contact is called. The PeopleFinder Client (101) may provide functionality such as a clickable tab, menu layouts, and the like that may enable the user to look up the contacts that have been called from within a configurable radius or at a particular time. Hence, the user may be enabled to filter and sort the call history according the current time or current location. For example, the PeopleFinder Client (101) may detect the current location of the user and then may look up the call history location information from the PeopleFinder database (103) through the PeopleFinder server (102). This may result into a list of the contacts called from within a 10 mile radius (configurable) in the order of their distance to be displayed on the PeopleFinder client. Such a facility may enable users to find the most relevant contacts they have at any particular location. The call history facility may also provide the call history based on the current time at the user's current location. For example, the time the user makes a call to a contact, may be recorded by the PeopleFinder client (101) and stored in the PeopleFinder database (103) via the PeopleFinder server (102), using web service calls. Hence, when the user selects the option relating to the current time such as AtCurrentTime Tab as shown in FIG. 8, the current time is checked by the PeopleFinder Client (101) and all calls made to contacts within a range of an hour before or hour after the current time may be displayed in the order the contacts called at the closest time to the current time displayed first.

Figure 9:
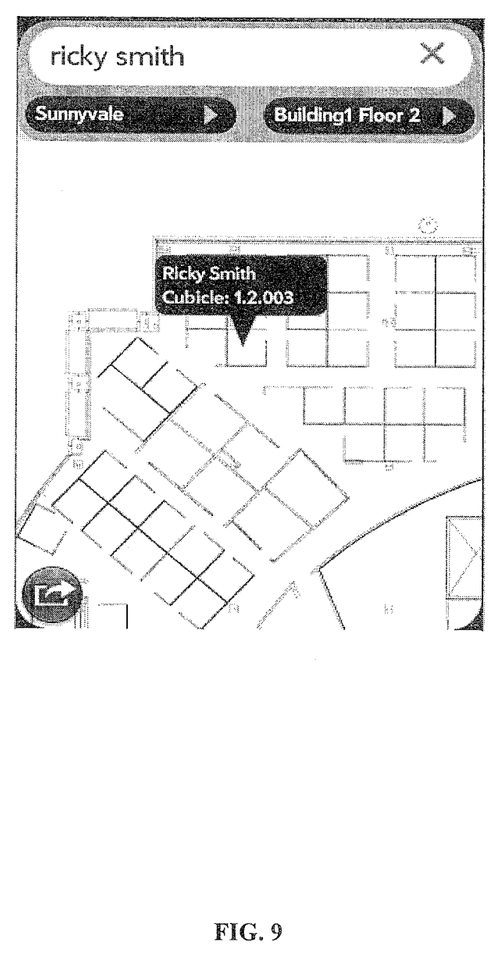
FIG. 9 illustrates a screen displaying a searched person's office or resource's location on an office building floor map along with a multiple zoom level facility in accordance with an embodiment.

In an embodiment, the present invention may provide a contact or resource location presentation facility with a Multi-Zoom Level Map. The PeopleFinder Client (101) may allow the user to search for a contact or resource using the search box and once the contact details are retrieved from the PeopleFinder database (103) via the PeopleFinder server (102), the associated floor map of the record may be loaded and the cubicle or conference room may be displayed on a floor map of the contact or resource as stored in the corresponding contact record or resource record. Multiple zoom levels may be enabled on this floor map. Such functionality is illustrated by FIG. 9.

Figure 10:
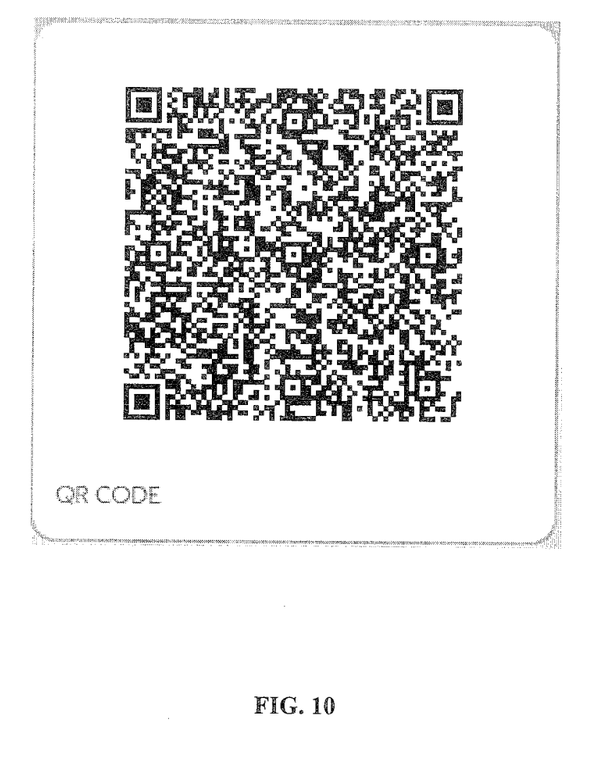
FIG. 10 illustrates a Quick response code/QR code being displayed on the mobile device with respect to the user of the mobile device.

In another embodiment, a Quick response code may be associated with each user utilizing the PeopleFinder enterprise system (100). The PeopleFinder Client (101) may enable displaying a "my profile" screen on the mobile device that may display a QR code of the user, as shown in FIG. 10. Such a QR code may be utilized for sharing contact details between various users of the PeopleFinder Client (101). Furthermore, the last check-in location and Call barring details related to a user may also be displayed on the "my profile" screen.

Figure 11:
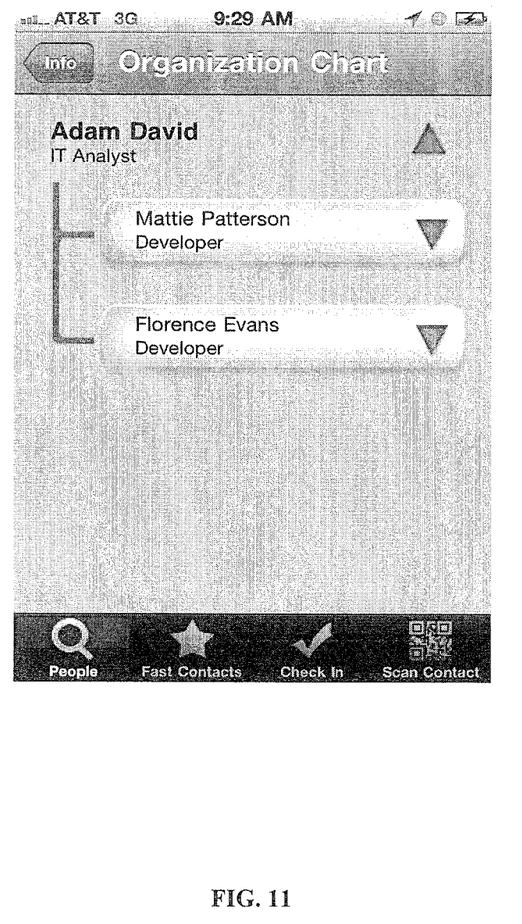
FIG. 11 illustrates a presentation method of the Organization Chart with navigation on the mobile device in accordance with an embodiment.

The PeopleFinder system may also provide a facility for presenting an Organization Chart of a contact with navigation on a mobile device: The PeopleFinder Client (101) may provide a distinctive presentation of the Organization Chart as illustrated FIG. 11. Such an Organization Chart may be traversed in a sequential manner upward or downward in the organization tree structure.

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

The invention claimed is:

1. A system for searching one or more resources in an enterprise, the system comprising:
   a client device;
   a server being communicatively coupled with the client device;
   a database server being communicatively coupled with the server, and communicatively coupled with one or more enterprise database configured to store a plurality of records containing information pertaining to said one or more resources including geolocation coordinates of the said one or more resources;
   wherein the client device is configured to
   receive one or more keywords from an input means;
   determine its own geolocation co-ordinates;
   receive an input for transmitting the geolocation co-ordinates to the server;
   transmit said keywords along with the geolocation co-ordinates to the server; and
   query the server for retrieving a time zone information related to the one or more resources;
   wherein the server is configured to
   create and execute a multi-stage search query on the database server by using the received one or more keywords;
   retrieve the geolocation co-ordinates and a lookup table containing time zone information related to geolocation co-ordinates from the enterprise database via the database server;
   determine a record related to the client device in the enterprise database;
   store the geolocation co-ordinates in the record; and
   compute and transmit the time zone information to the client device;
   the database server is configured to retrieve one or more resource information from the records stored in the enterprise database and to send the one or more resource information to the server; and
   the server is further configured to send the one or more resource information to the client device,
   wherein the client device is configured to receive a setting information for blocking a communication request from a second resource for a defined time period, the client device is further configured to send the setting information to the server, the server is further configured to store the setting information in a related record stored in the enterprise database, and wherein the client device coupled with the second resource is configured to receive an asynchronous notification when the predefined time period is over.

2. The system as claimed in claim 1, wherein the database server is integrated with the server.

3. The system as claimed in claim 1, wherein the records comprise one or more of Resource Name, Organization name, Work Phone Number, Mobile Phone Number, Home Phone Number, Fax Number, Work Address, Home Address, Office Cubicle Number, Email Address, Manager Id, Geo Location coordinates of the resources, Expertise Profile Information.

4. The system as claimed in claim 1, wherein the one or more resources is a person in the enterprise and is communicatively coupled with a corresponding client device.

5. The system as claimed in claim 1, wherein the one or more resources is an electronic equipment in the enterprise.

6. The system as claimed in claim 1, wherein the client device is configured to receive an input for selectively sharing the geo location coordinates stored in the record with other resources in the enterprise.

7. The system as claimed in claim 1, wherein the client device transmits a request for retrieving a call history information related to the resource to the server; the server is configured to retrieve the call history information from the enterprise database by sending a request to the database server and by utilizing the Geo location co-ordinates, the server is further configured to transmit the call history information to the client device.

8. The system as claimed in claim 1, wherein the client device transmits a request for retrieving a time zone based call history information related to the one or more resources to the server; the server is configured to retrieve the call history information from the enterprise database by sending a request to the database server and by utilizing the time zone information; the server is further configured to transmit the call history information to the client device.

9. The system as claimed in claim 1, wherein the client device transmits a request for retrieving a floor map information related to the one or more resources to the server; the server is configured to retrieve the floor map information from the enterprise database by sending a request to the database server; the server is further configured to transmit the floor map information to the client device.

10. The system as claimed in claim 9, wherein the floor map information is a Multi-Zoom Level Map.

11. The system as claimed in claim 1, wherein the client device is associated with a Quick response code and displays and shares the Quick response code with one or more client devices.

12. The system as claimed in claim 11, wherein the Quick response code stores information related to the client device.

13. The system as claimed in claim 1, wherein the client device transmits a request for retrieving an Organization Chart information related to the one or more resources to the server; the server is configured to retrieve the Organization Chart information from the enterprise database by sending a request to the database server; the server is further configured to transmit the an Organization Chart information to the client device.

14. The system as claimed in claim 13, wherein the Organization Chart is traversed in a sequential manner upward or downward in an organization tree structure.

15. A method for searching one or more resource in an enterprise, the method is implemented by a processor using stored programmed instructions, the method comprising receiving one or more keywords from a client device;

creating and executing a multi-stage search query on a database server by using the one or more keywords;

retrieving geolocation co-ordinates and a lookup table containing time zone information related to the geolocation co-ordinates from an enterprise database, wherein the geolocation coordinates and the lookup table are associated with the client device;

determining a record related to the client device in the enterprise database;

storing the geolocation co-ordinates in the record;

computing and transmitting the time zone information to the client device;

retrieving one or more resource information from a database server; and sending the one or more resource information to the client device, wherein the client device is configured to receive a setting information for blocking a communication request from a second resource for a defined time period, the client device is further configured to send the setting information to the server, the server is further configured to store the setting information in a related record stored in the enterprise database, and wherein the client device coupled with the second resource is configured to receive an asynchronous notification when the predefined time period is over.

16. The method as claimed in claim 15, wherein the multi-stage search query is a two stage search query.

17. The method as claimed in claim 15, wherein the multi-stage search query is a web based XML query.

* * * * *